United States Patent
Fushikida et al.

(10) Patent No.: US 7,681,948 B2
(45) Date of Patent: Mar. 23, 2010

(54) AUTOMOTIVE SEAT

(75) Inventors: Motohiro Fushikida, Yokohama (JP); Atsushi Miyake, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 154 days.

(21) Appl. No.: 11/902,963

(22) Filed: Sep. 26, 2007

(65) Prior Publication Data
US 2008/0284221 A1 Nov. 20, 2008

(30) Foreign Application Priority Data
Sep. 27, 2006 (JP) .............................. 2006-262551

(51) Int. Cl.
*B60N 2/42* (2006.01)
(52) U.S. Cl. ................. 297/216.1; 297/344.15
(58) Field of Classification Search .............. 297/216.1, 297/216.16, 216.17, 216.19, 216.2, 344.12, 297/344.14, 344.15
See application file for complete search history.

(56) References Cited

U.S. PATENT DOCUMENTS

| 4,566,667 | A | * | 1/1986 | Yanagisawa | ................. 248/561 |
| 4,714,227 | A | * | 12/1987 | Holm et al. | ................. 248/595 |
| 5,882,061 | A | * | 3/1999 | Guillouet | ................. 296/65.05 |
| 6,425,557 | B1 | * | 7/2002 | Becker et al. | ................. 248/157 |
| 7,338,118 | B2 | * | 3/2008 | Ichikawa et al. | ......... 297/216.1 |
| 2007/0284922 | A1 | * | 12/2007 | Matsuhashi | ............... 297/216.2 |

FOREIGN PATENT DOCUMENTS

| JP | 2002-142908 A | | 5/2002 |
| JP | 2004-009997 A | | 1/2004 |
| WO | WO2005/042298 | * | 5/2005 |

* cited by examiner

*Primary Examiner*—David Dunn
*Assistant Examiner*—Patrick Lynch
(74) *Attorney, Agent, or Firm*—Foley & Lardner LLP (57) ABSTRACT

Disclosed is an automotive seat the seat cushion level of which can be adjustable up-and-down, in which the safety is improved when a shock is applied to a vehicle. The automotive seat according to a preferred embodiment of the present invention is equipped with a level adjusting mechanism for adjusting the seat cushion level, and comprises a base frame, a seat cushion, a seat cushion frame, a space from which to the base frame being adjustable, a stopper which supports the sinking seat cushion frame at a rear end collision of an automobile. The stopper moves to narrow the space between the seat cushion frame and the stopper and supports the seat cushion frame.

7 Claims, 5 Drawing Sheets

AUTOMOTIVE SEAT

BACKGROUND OF THE INVENTION

1. Field of the Invention

The present invention relates to an automotive seat, particularly to an automotive seat equipped with a lifter function which can adjust the level of a seat cushion.

2. Description of the Related Art

There has been a type of automotive seat which is equipped with a lifter function to adjust the level of the seat cushion. For example, Japanese unexamined patent application publication No. 2002-142908 discloses an example that a link mechanism provided under the seat pivots to rise so that the seat is lifted up by the link rise amount. In order to reduce the number of components, the components to lift up and down the seat cushion are simply constructed. The example of Japanese unexamined patent application publication No. 2002-142908 is constructed mainly by only a front link and a rear link to support the seat.

When an impact is applied to an automobile due to a low speed rear end collision, the impact is transmitted to a seat inside the vehicle. In an automobile with a mechanism to lift up and down the seat cushion, safety against the impact applied to the vehicle may be impaired depending on the mechanism. A link mechanism is considered, by way of example, in which two each links on the right and the left of the seat cushion, four in total, are provided, and one or two of them are not linked to power, or link-free, in order to simplify the mechanism and reduce the number of components. In this case, inertia force of the seat due to the collision turns the free links. Then, the seat supported in a lifted-up state above the base by the links descends abruptly so that a shock is applied to the occupant who has sat on the seat. If only the rear links of the front and rear links turn, only the rear part of the seat descends so that the occupant tilts backward and a shock is applied to the occupant.

The present invention has been accomplished in view of the foregoing circumstances and an object of the invention is to provide an automotive seat, whose seat cushion is adjustable in level up and down, with improved safety at the time of application of an impact to the vehicle.

SUMMARY OF THE INVENTION

The automotive seat according to the present invention is an automotive seat having a level adjusting mechanism for adjusting a seat cushion level comprising: a base frame, a seat cushion frame on which a seat cushion is formed and being capable of adjusting a space therefrom to the base frame, and a stopper for supporting the seat cushion frame which sinks at a rear end collision of an automobile. The stopper moves to narrow a space therefrom to the seat cushion frame to support the seat cushion frame. This achieves to provide an automotive seat whose seat cushion level is adjustable and having improved safety at the time of application of an impact to the vehicle.

Here, the stopper preferably moves with changes in a space between the seat cushion frame and the base frame. This achieves for the stopper to support the seat cushion frame at a position close to the seat cushion frame.

Further, it is preferred that the stopper is pivotably linked to the base frame at one of longitudinal ends of the stopper and supports the seat cushion frame with the other end of the stopper, and the automotive seat further comprises a link plate which is pivotably linked to the base frame at one of longitudinal ends of the link plate, pivotably linked to the seat cushion frame at the other end of the link plate, and pivots with the changes in the space between the seat cushion frame and the base frame and a stopper pusher which pivots integrally with the link plate and pushes and moves the stopper as the space between the seat cushion frame and the base frame becomes larger so that the stopper pivots toward the seat cushion frame. This achieves to narrow the space between the stopper and the seat cushion frame.

In addition, it is preferred that the stopper pusher comprises a slider for sliding on a sliding surface of the stopper and pushes and moves the stopper, and the sliding surface has an inclined surface to adjust the pivot of the stopper in association with the pivot of the stopper pusher. This achieves to keep the space between the seat cushion frame and the stopper preferably.

In addition, it is preferred that the stopper pusher comprises a slider for sliding on a sliding surface of the stopper and pushes and moves the stopper, a changing amount in a space between the slide and the base frame with respect to a pivot angle of the stopper pusher is changed in accordance with pivot of the stopper pusher, and the sliding surface has a shape to compensate the change of the changing amount. This achieves to keep the space between the seat cushion frame and the stopper preferably.

It is preferred that the stopper moves so as to narrow a space from the stopper to the seat cushion frame at the rear end collision of the automobile and supports the seat cushion frame. This achieves to suppress a sinking amount in the seat cushion frame in case that the seat cushion frame sinks.

It is preferred that the stopper is apart from the seat cushion frame in a normal state and supports the seat cushion frame which sinks at the rear end collision of the automobile. This achieves to improve comfort in sitting on the seat in a normal state.

It is preferred that the seat cushion frame comprises a lock having a plurality of teeth and the stopper is linked to the base frame via a pivotal shaft at one of longitudinal ends thereof, pivots about the pivotal shaft and engages with at least one of the teeth of the lock at the other longitudinal end to support the sinking seat cushion frame. This achieves that the stopper can support the seat cushion frame even in a state that the stopper is inclined.

Further, it is preferable that the stopper pivots with changes in the space between the seat cushion frame and the base frame, the stopper engages with at least one of the teeth of the lock to support the sinking seat cushion frame if the space between the pivotal shaft and the seat cushion frame is smaller than the space between the pivotal shaft and the opposite end of the stopper to the pivotal shaft, and the stopper supports the sinking seat cushion frame with the opposite end of the stopper to the pivotal shaft in a state that the stopper stands straight if the space between the pivotal shaft and the seat cushion frame is larger than the space between the pivotal shaft and the opposite end of the stopper to the pivotal shaft. This achieves to deal with various spaces between the seat cushion frame and the base frame.

The present invention provides an automotive seat, whose seat cushion is adjustable in level up and down, with improved safety at the time of application of an impact to the vehicle.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
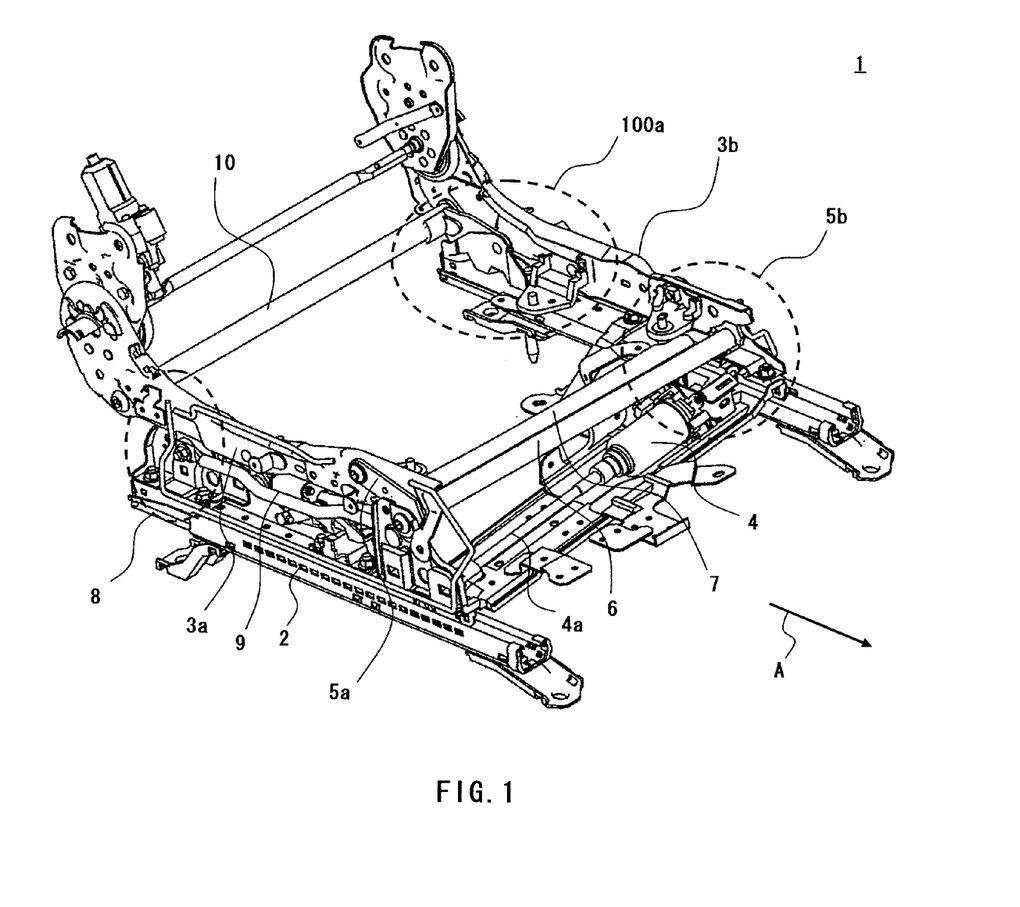
FIG. 1 is a perspective view showing the lower frame of the automotive seat according to an embodiment of the present invention.

Hereinbelow, a preferred embodiment of the present invention is described. For clearness of the explanation, the following description and the accompanied drawings contain omissions and simplifications as appropriate. Throughout the drawings, the same components are denoted by like reference numerals, and their repetitive description is omitted if not necessary. FIG. 1 is a perspective view illustrating a lower frame 1 for an automotive seat according to the present embodiment. When the lower frame 1 shown in FIG. 1 is used in an automotive seat, the direction indicated by an arrow A is front. That is, an occupant sits to face the direction of the arrow A when he or she sits on the seat cushion.

Figure 2:
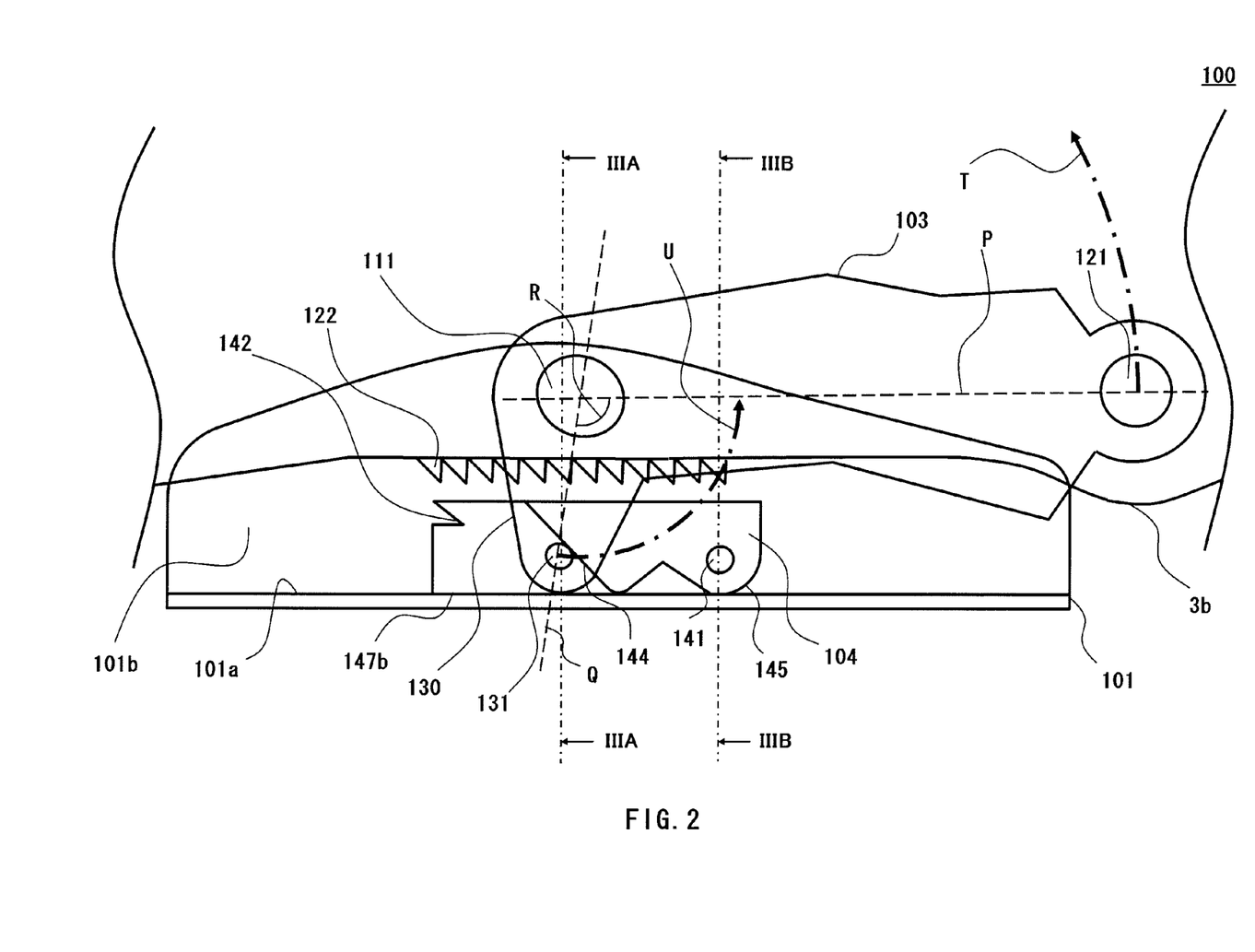
FIG. 2 is a transparent side view schematically showing the free link mechanism according to an embodiment of the present invention.

The lower frame 1 for the automotive seat according to the present invention comprises a base frame 2, a right side frame 3a, a left side frame 3b, a motor 4, a front right lifter 5a, a front left lifter (not shown), a front power shaft 6, a front connect shaft 7, a rear right lifter (not shown), a side power shaft 9, a rear connect shaft 10, and a free link 100 (shown in FIG. 2). Here, apart consisted of the right side frame 3a, the left side frame 3b, and the front connect shaft 7 and the rear connect shaft 10 for connecting these is called as a seat cushion frame, a part consisted of the front right lifter 5a and the front left lifter is called as a front lifter. In addition, a part consisted of the front lifter, the rear right lifter, and the free link 100 is called as a link mechanism.

The base frame 2 is a part to be fixed to the base of the vehicle body and becomes a base of the lower frame 1. The seat cushion frame is a part to be a frame for the seat frame and another frame is linked to its rear end to form a backrest of the seat. In the seat cushion frame, the right side frame 3a and the left side frame 3b are positioned at the right and the left respectively to face each other and linked by the front connect shaft 7 and the rear connect shaft 10. The motor 4 is a power supply to lift up the seat cushion frame from the base frame 2. The motor 4 is linked to the front right lifter 5a via a gear not shown and thereby power is supplied to the front right lifter 5a.

The front right lifter 5a links the base frame 2 and the front end of the right side frame 3a to lift up the front end of the right side frame 3a from the base frame 2 according to the power supplied from the motor 4. The front right lifter 5a is a long plate-shaped member and pivots by pivot force supplied from the motor 4 to transform the pivot force into up-and-down force. The power of the motor 4 is transmitted to the front left lifter placed within the range 5b in the drawing via the front power shaft 6. Also, the power of the motor 4 is transmitted to the rear right lifter placed within the range 8 in the drawing via the side power shaft 9.

The front left lifter links the base frame 2 and the front end of the left side frame 3b in the region 5b in the drawing and lifts up the front end of the left side frame 3b from the base frame 2 according to the power supplied from the front power shaft 6. The front left lifter has the substantially same mechanism as the front right lifter 5a and transforms pivot force into up-and-down force. The rear right lifter links the base frame 2 and the rear end of the right side frame 3a in the region 8 in the drawing and lifts up the right side frame 3a according to the power supplied from the side power shaft 9. The rear right lifter has the substantially same mechanism as the front right lifter 5a and transforms pivot force into up-and-down force.

The power supplied by the motor 4 causes that the front right lifter 5a and the rear right lifter lift up the right side frame 3a horizontally and that the front left lifter lifts up the front end of the left side frame 3b. Because the right side frame 3a and the left side frame 3b are linked via the front connect shaft 7 and the rear connect shaft 10, the left side frame 3b is also lifted up horizontally. The free link 100 does not supply power when the seat cushion frame is lifted up from the base frame 2 and is a linking part to link the base frame 2 and the seat cushion frame in a region 100a in FIG. 1. This enables to simplify the link mechanism and to reduce the number of components.

Because the front right lifter 5a, the front left lifter, and the rear right lifter are connected to power, if a shock is applied to the automobile, the power becomes a stopper to prevent an abrupt up-and-down level change. However, the free link 100 is not connected to the power between the base frame 2 and the seat cushion frame, which may result in that only the free link 100 may pivot due to deflection and twist of the seat cushion frame. As a result, the seat cushion will be inclined. To prevent this, the free link 100 has a function to avoid an abrupt sinking of the rear end of the left side frame 3b when a shock has been applied to the automobile. The base frame 2 has a rail, and the members such as the front lifter, the rear right lifter, and the free link 100 and so on placed on the base frame 2 are movable along the rail.

Figure 3A:
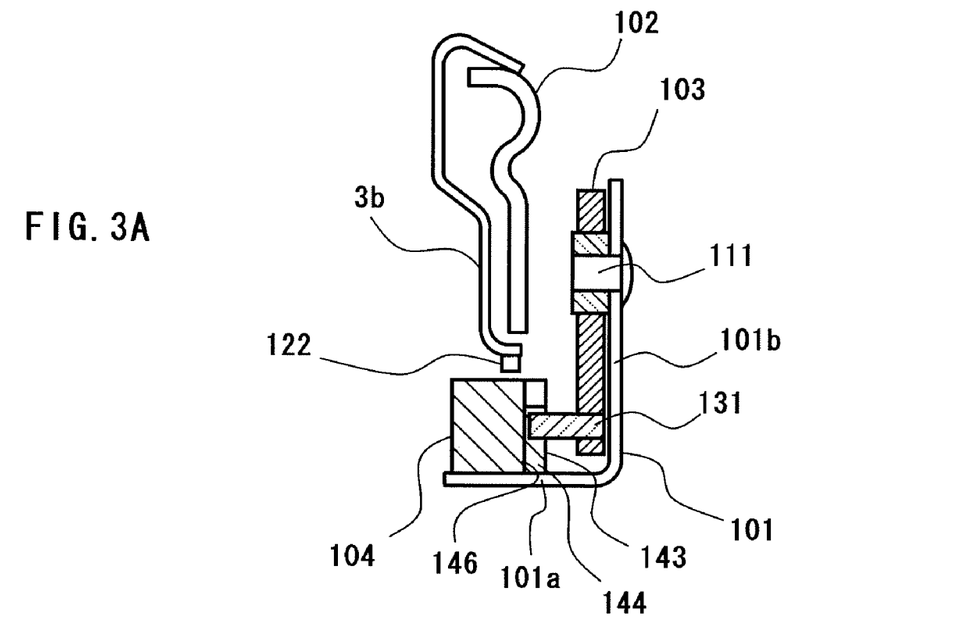
FIGS. 3A and 3B are cross-sectional views schematically showing the free link mechanism according to an embodiment of the present invention.
Figure 3B:
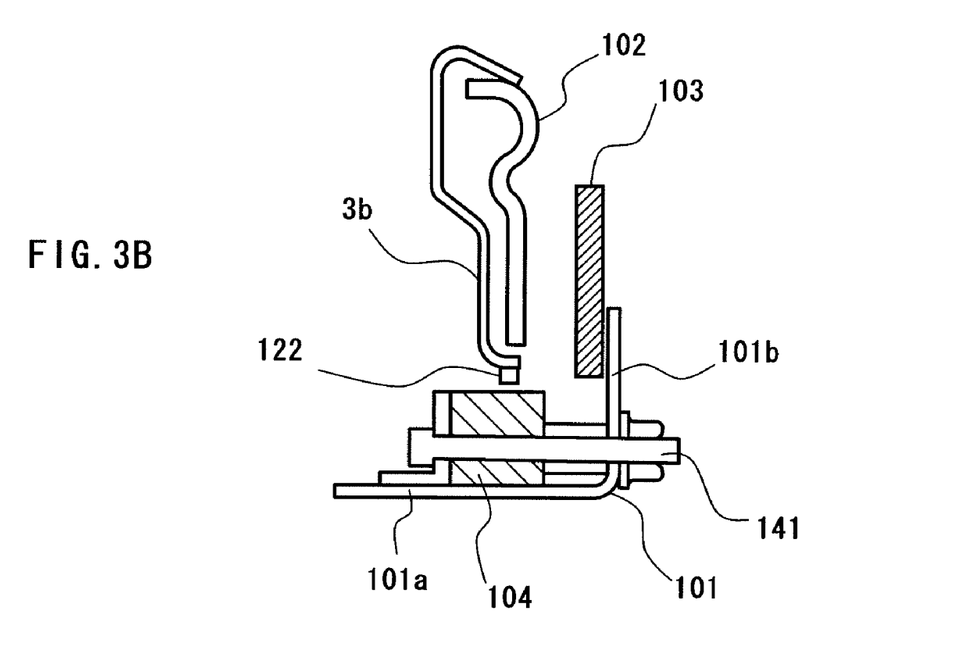

Now referring to FIGS. 2, 3A, and 3B, the free link 100 is described in detail. FIG. 2 is a side view of the free link 100 from the outside. In FIG. 2, the respective components are illustrated transparently for the sake of clearness of illustration and shown is a state that the seat cushion frame is at the lowest (downmost) position. FIG. 3A is a cross sectional view along the IIIA-IIIA line in FIG. 2 and the FIG. 3B is a cross sectional view along the IIIB-IIIB line in FIG. 2. The free link 100 comprises a lower plate 101, an upper plate 102, a link plate 103, and a stopper 104. The lower plate 101 may be configured as a part of the base frame 2, and the upper plate 102 may be configured as a part of the seat cushion frame.

Figure 5A:
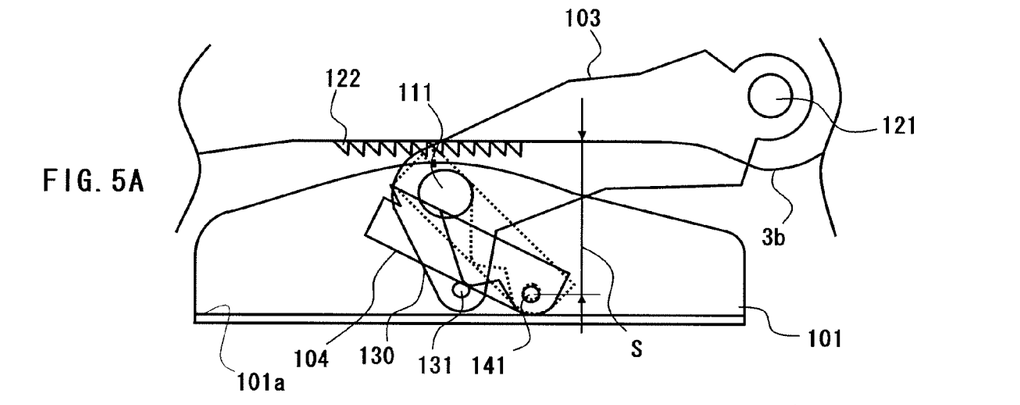
FIGS. 5A through 5C are transparent side views schematically showing the movement of the free link according to an embodiment of the present invention.
Figure 5B:
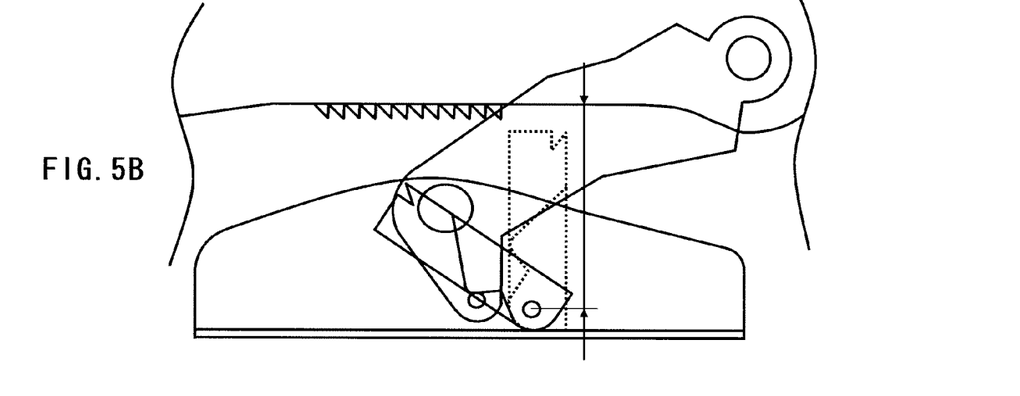
Figure 5C:
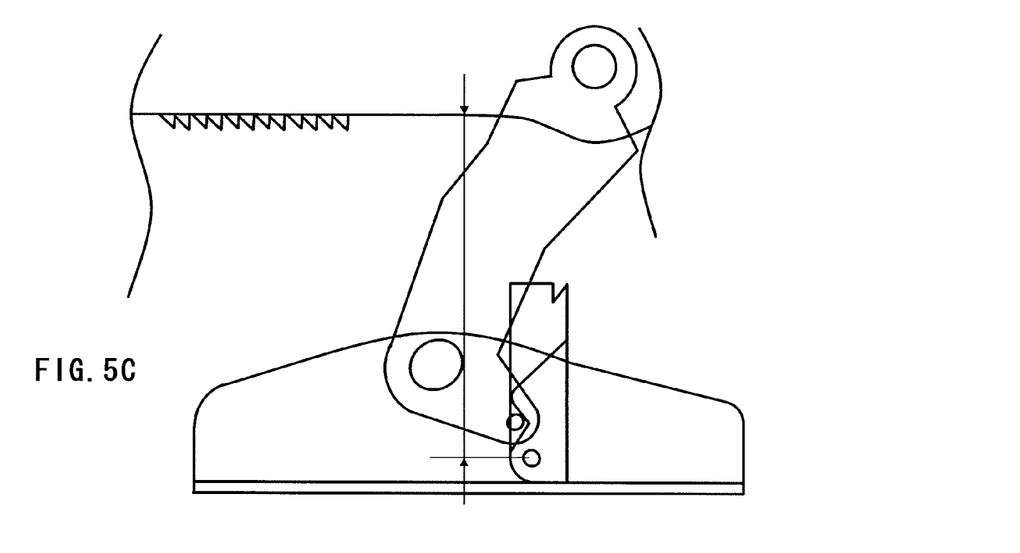

FIGS. 5A, 5B, and 5C are side views showing the movement of the free link 100 according to the present embodiment. In the free link 100 according to the present embodiment, the link plate 103 pivots in association with change of the space between the left side frame 3b and the lower plate 101 as shown in FIGS. 5A, 5B, and 5C. Then, a stopper pusher 130 which pivots integrally with the link plate 103 pushes the stopper 104 to pivot. When the left side frame 3b descends abruptly, the stopper 104 supports the left side frame 3b to prevent the seat cushion from sinking abruptly. When a rear end collision occurs, inertia force by the impact raises the stopper 104 so that the space between the left side frame 3b and the lower plate 103 becomes much more narrower. Hereinbelow, each part is described in detail.

The lower plate 101 is a part to be a base of the free link 100 and is linked with the base frame 102. Here, the lower plate 101 is placed on a rail included in the base frame 2 and is movable along the rail. The link plate 103 and the stopper 104 are pivotably linked to the lower plate 101. The lower plate 101 is bent substantially vertically and has a horizontal plate 101a which is a mount surface for the base frame 2 and a vertical plate 101b which is vertical to the horizontal plate 101a and is linked with the link plate 103 and the stopper 104. In the following description, the parallel plane to the horizontal plate 101a is defined as the horizontal direction.

The upper plate 102 is a part to be linked with the left side frame 3b. When the motor 4 works, the seat cushion frame is lifted up so that the upper plate 102 linked with the left side frame 3b is lifted up and rises with respect to the lower plate 101. The link plate 103 is linked pivotably to the upper plate 102. A lock plate 122, which is a plurality of teeth facing the horizontal plate 101a of the lower plate 101, is formed close to the region where the left side frame 3b is linked to the free link 100. As shown in FIGS. 2, 3A, and 3B, the stopper 104, the left side frame 3b, and the lock plate 122 are placed to overlap in the direction parallel to the plate surface of the horizontal plate 101a.

The link plate 103 is a long plate-shaped member. The link plate 103 is linked to the base frame 2 via the lower plate 101 and linked to the seat cushion frame via the upper plate 102. A pivotal shaft 111 pierces through through-holes formed on the lower plate 101 and the link plate 103 respectively, which links the lower plate 101 and the link plate 103 pivotably. Further, a pivotal shaft 121 pierces through through-holes formed on the upper plate 102 and the link plate 103 respectively, which links the upper plate 102 and the link plate 103 pivotably.

The link plate 103 is substantially L-shaped and has a longitudinal part and a stopper pusher 130 projecting from the end of the longitudinal part. The pivotal shafts 111 and 121 pierce the both end parts of the longitudinal part respectively and the stopper pusher 130 is formed at the end part where the pivotal shaft 111 pierces. A pin 131 is provided close to the tip end of the stopper pusher 130, projecting vertically with respect to the plate surface of the link plate 103. The pin 131 is in contact to the stopper 104 and pushes and moves the stopper 104 as it slides on the stopper 104 in association with the pivot of the link plate 103. Details thereof will be described later. With regard to the plate surface of the link plate 103, an angle formed by a line P running through the part pierced by the pivotal shaft 111 and the part pierced by the pivotal shaft 121 and a line Q running through the part pierced by the pivotal shaft 111 and the part where the pin 131 is provided is denoted by R.

Figure 4A:
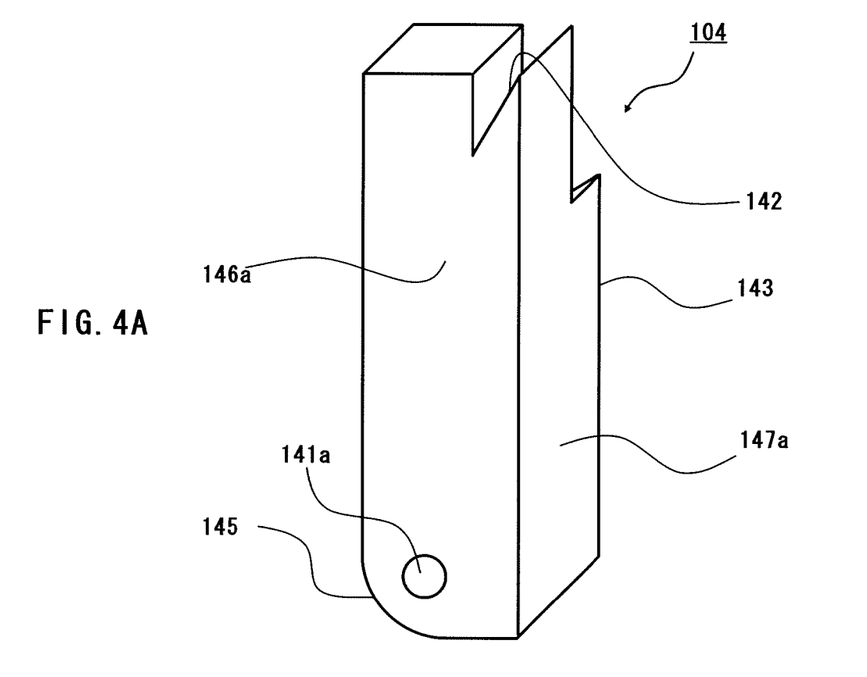
FIGS. 4A and 4B are perspective views schematically showing the stopper included in the free link mechanism according to an embodiment of the present invention.
Figure 4B:
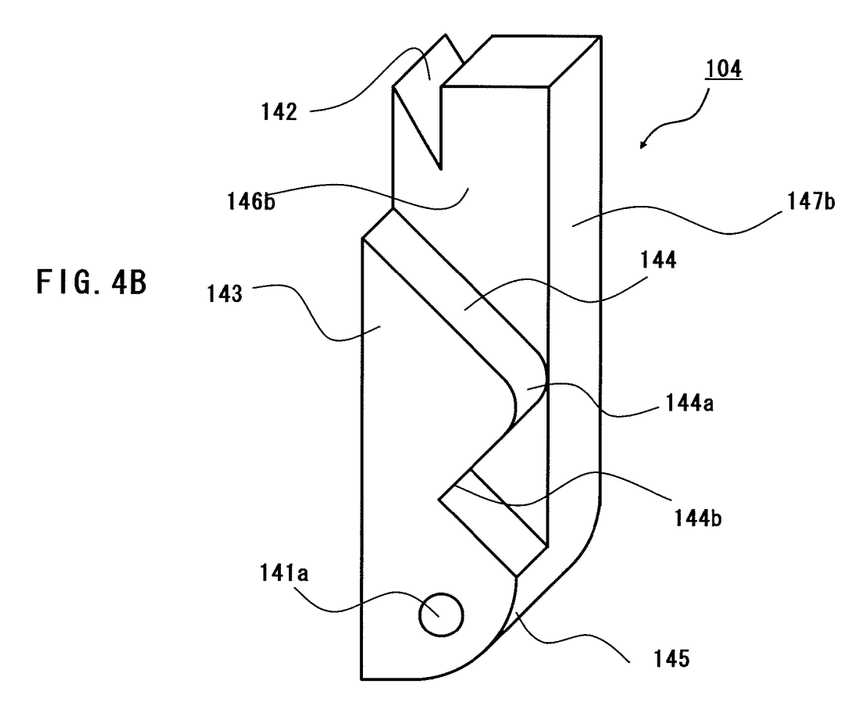

Now referring to FIGS. 4A and 4B, the stopper 104 will be described. FIGS. 4A and 4B are perspective views of the stopper 104 viewed from the opposite sides each other. As shown in FIGS. 4A and 4B, the stopper 104 is a member which is basically a square pole. A through-hole 141a which penetrates through from one side surface 146a to the opposed side surface 146b is formed near the end of the stopper 104. A pivotal shaft 141 pierces the through-hole 141a and another through-hole formed on the lower plate 101 so that the stopper 104 is linked to the lower plate 101 pivotably. The stopper 104 is located between the lower plate 101, the upper plate 102, and the seat cushion frame and serves to receive an abrupt sinking of the seat cushion frame.

At the end of the stopper 104 opposite to the end where the through-hole 141a is formed, a notch 142 is formed. The notch 142 is formed by cutting out from the side surface 146a to the side surface 146b at the end opposite to the end where the through-hole 141a is formed. The end of the stopper 104 where the notch 142 is formed becomes a supporter for supporting the seat cushion frame.

On the side surface 146b, a pin slide 143 is formed. As shown in FIG. 4B, the pin slide 143 has a pin sliding surface 144 which is perpendicular to and projected from the side surface 146b. As shown in FIG. 4B, the pin sliding surface 144 is formed to incline with respect to the side surfaces 147a (shown in FIG. 4A) and 147b. The pin sliding surface 144 has, as shown in FIG. 4B, a curved surface 144a and a bent part 144b and the inclination to the side surfaces 147a and 147b is changed. The pin slide 143 becomes a pushed part which is pushed and moved by the pin 131 of the stopper pusher 130. The end of the stopper 104 where the through-hole 141a is formed and the side surface 147b are continued via the curved surface 145, which is formed so as to draw an arc with respect to the axis of the through-hole 141a. The curved surface 145 prevents other members from interfering in the pivot of the stopper 104 about the through-hole 141a.

Next, referring to FIGS. 2 and 5A through 5C, movement of the free link 100 according to the present embodiment is described. First, movement of the stopper pusher 130 and the stopper 104 are described. As shown in FIG. 2, the line P is substantially parallel to the plate surface of the horizontal plate 101a in a state that the seat cushion frame is downmost. That is, the positions of the pivotal shafts 111 and 121 in the direction vertical to the horizontal plate 101a are substantially the same. The stopper pusher 130 protrudes, facing toward the horizontal plate 101a. The line Q is nearly vertical to the horizontal plate 101a. The pin 131 is located closer to the horizontal plate 101a than the pivotal shaft 111. The stopper 104 is positioned so that its side surface 147b touches the horizontal plate 101a, and the pin 131 is placed to touch the pin sliding surface 144.

As indicated by the dashed-lined arrow T in FIG. 2, when the link plate 103 pivots toward the direction in which the pivotal shaft 121 is raised (anticlockwise in FIG. 2), the pin 131 pushes and moves the pin sliding surface 144. That is, when the link plate 103 pivots so that the pivotal shaft 121 moves along a trajectory of the arrow T, the pin 131 moves along a trajectory indicated by the dashed-lined arrow U in FIG. 2. In other words, the pin 131 moves toward the direction which is away from the base frame 2 with an arc-shaped trajectory as the distance between the seat cushion and the base frame increases.

The pivotal shaft 141 is located opposite to the pin 131 with respect to the pin sliding surface 144. When the pin 131 moves in association with the pivot of the link plate 103, the pin 131 pushes and moves the pin sliding surface 144, sliding on the pin sliding surface 144, and the stopper 104 pivots about the pivotal shaft 141. That is, the pin 131 makes the stopper 104 pivot from a horizontal state to a vertical state in its longitudinal direction. In other words, the stopper 104 turns around from a lying state to a standing state.

The link plate 103 has the substantially same mechanism as the ones included in the front lifter and the rear right lifter. Power supplied by the motor 4 to the front right lifter 5a makes the seat cushion frame lifted up so that the link plate 103 pivots. At this time, the motor 4 supplies a pivot force for pivoting at a constant angular rate so that the link plate 103 pivots at a constant angular rate. The pin 131 moves in an arc about the pivotal shaft 111 in a plane parallel to the vertical plate 101b in association with the pivot of the link plate 103, as indicated by the arrow U in FIG. 2. Therefore, the velocity at which the pin 131 moves away from the horizontal 101a in the direction vertical to its plate surface is not constant. That is, the larger the angle formed by the velocity direction of the pin 131, i.e., the tangential line of the present position of the pin 131 in the arc-shaped moving trajectory of the pin 131, and the horizontal plate 131a is, the faster the velocity at which the pin 131 moves away from the horizontal plate 131a is. As a result, the angular rate of the stopper 104 which is pushed and moved by the pin 131 to pivot about the pivotal shaft 141 and rise, or the speed at which the stopper 104 rises up, changes.

The pin sliding surface 144 has the curved surface 144a and the bent part 144b to be formed as an inclined surface having slopes because the stopper 104 is adjusted to rise well in association with the movement trajectory of the pin 131. The rising velocity of the stopper 104 can be adjusted by adjusting the angle R to change the movement trajectory of the pin 131 other than by adjusting the inclination of the pin sliding surface 144. Also, changing the distance between the pivotal shafts 121 and 111 or the distance between the pivotal shaft 111 and the pin 131 can change the movement trajectory of the pin 131 so that the stopper 104 is adjusted to rise well.

Further, the above-described adjusting the pivot trajectories of the pin sliding surface 144 and the pin 131 enables to adjust the rising velocity of the stopper 104 in association with the velocity at which the pin 131 moves away from the horizontal plate 131a. Specifically, a moving amount vector of the pin 131 by the pivot of the link plate 103 is split into a component of the direction vertical to the pin sliding surface 144 and a component of the direction horizontal to the pin sliding surface 144. The component of the direction vertical to the pin sliding surface 144 pushes and move the stopper 104 so that the stopper 104 pivots about the pivotal shaft 141. The pivot amount at this time is determined by the component of the pivot direction of the stopper 104 of the components of the moving amount vector of the pin 131 in the direction vertical to the pin sliding surface 144.

The pivot amount of the stopper 104 pushed and moved by the pin 131 is given by the component of the pivot direction of the stopper 104, i.e., the direction vertical to the longitudinal direction of the stopper 104 of the component vertical to the pin sliding surface 144 of the moving amount vector of the pin 131. Therefore, assuming that the movement trajectories of the pin 131 and the stopper 104 are fixed, the pivot amount of the stopper 104 is determined by the inclination of the pin sliding surface 144. That is, considering the contact position of the pin 131 to the pin sliding surface 144 in the state of pivot of the link plate 103, changing the inclination of the pin sliding surface 144 can adjust the angular rate of the stopper 104 which pivots about the pivotal shaft 141. Changing the movement trajectories of the pin 131 and the pivotal shaft 104, i.e., the positioning relationship between the pin pusher 130 and the stopper 104, can accomplish the foregoing adjustment, too.

Next, movement of the upper plate 102 and the seat cushion frame linked to the upper plate 102 will be described. When the motor 4 works, the seat cushion frame is lifted up by the front lifter and the rear right lifter so that the seat cushion frame is lifted up and rises with respect to the base frame 2. Thereby, the upper plate 102 linked to the seat cushion frame also rises with respect to the lower plate 101. As the upper plate 102 rises, the pivotal shaft 121 rises. Thereby, the link plate 103 pivots about the pivotal shaft 111 on the plane parallel to the plate surface of the link plate 103.

Because, at this time, the pivotal shaft 121 moves in an arc about the pivotal axis 111 as indicated in the arrow T in FIG. 2, not only the pivotal shaft 121 moves away vertically from but also moves relatively horizontally to the horizontal plate 101a. Therefore, the upper plate 102 not only moves away vertically from and but also moves relatively horizontally to the lower plate 101, too.

The amount of the horizontal position shift of the seat cushion frame in association with its vertical movement with respect to the base frame 2 is determined by the mechanism of the link mechanism. Here, the respective amounts of the horizontal position shifts caused by the vertical movement of the front right lifter 5a, the front left lifter, the rear right lifter, and the free link 100 are the same. As described above, the velocity at which the pivotal shaft 121 moves away from the horizontal plate 101a is not constant since the link plate 103 pivots at a constant angular rate. Therefore, the velocity at which the left side frame 3b moves away from the horizontal plate 101a is not constant, either.

As shown in FIGS. 2 and 5A through 5B, the link plate 103 pivots in association with the rise of the left side frame 3b so that the stopper 104 pivots to rise. FIG. 5C shows a state of the highest (uppermost) position of the seat cushion frame. Here, in order to receive an abrupt sinking of the seat cushion frame, the space between the left side frame 3b and the stopper 4 is preferably narrow and the stopper 104 is preferably always in touch with the lower end of the left side frame 3b. However, considering of a bending of the lower frame 1 at the time of the occupant's sitting on the seat cushion, it is preferred that a certain space is provided between the lower end of the left side frame 3b and the stopper 104. Accordingly, the left side frame 3b and the stopper 104 are apart in the normal state.

The space between the left side frame 3b and the stopper 104 is 8 mm, for example. The space between the left side frame 3b and the stopper 104 can be adjusted by adjusting the above-described rising velocity of the stopper 104 with respect to the velocity at which the left side frame 3b moves away from the horizontal plate 101a. That is, adjusting the shape of the pin sliding surface 144, the angle R, the space between the pivotal shafts 121 and 111, and the space between the pivotal shaft 111 and the pin 131 enables to adjust the space between the left side frame 3b and the stopper 104 in the pivot state of the link plate 103.

A case that a rear end collision occurs to an automobile will be considered. Here, the rear end collision means that an impact is applied from behind the automobile toward the traveling direction of the automobile, that is, a shock in the same direction as the one in which the automobile is traveling is applied at the rear part of the automobile. The shock of the rear end collision is transmitted to the lower frame 1, and leftward force in FIGS. 5A through 5C is applied to the lower plate 101. That is, force in the direction substantially parallel to the horizontal plate 101a and the vertical plate 101b, namely the direction from the position where the pivotal shaft 141 is located to the position where the pin 131 is located in a state that the seat cushion frame is downmost is applied to the lower plate 101. In other words, in a state that the seat cushion frame is downmost, force in the direction from the pivotal shaft 121 to the pivotal shaft 111 works.

When the lower plate 101 is pushed and moved toward the traveling direction of the automobile by the force worked on the lower plate 101 at the time of rear end collision, force in the opposite direction caused by inertia force is applied to the seat cushion frame. The inertia force applied to the seat cushion frame is transmitted to the link plate 103. As a result, pivot force about the pivotal shaft 111 arises on the link plate 103. The pivot force occurring to the link plate 103 works in the direction in which the pivotal shaft 121 moves close to the lower plate 101. Accordingly, the link plate 103 pivots about the pivotal shaft 111 in the direction in which the pivotal shaft 121 moves close to the lower plate 101. That is, in FIGS. 5A through 5C, the link plate 103 pivots clockwise. Consequently, the left side frame 3b descends.

The force by the rear end collision is transmitted to the stopper 104 via the pivotal shaft 141. As a result, pivot force about the pivotal shaft 141 occurs to the stopper 104. The pivot force occurring to the stopper 104 works in the direction in which the stopper 104 rises. Therefore, the stopper 104 pivots about the pivotal shaft 141 in the direction in which the stopper 104 rises. That is, in FIGS. 5A through 5C, the stopper 104 pivots clockwise. As a result, the stopper 104 supports the descending left side frame 3b and prevents an abrupt descending of the left side frame 3b.

Defining a space between the position of the pivotal shaft 141 and the lower end of the left side frame 3b facing the stopper 104 in the direction vertical to the plate surface of the horizontal plate 101a as S, the operation of the stopper 104 depending on differences in S will be described. FIG. 5A shows a state that the S is shorter than the length from the through-hole 141 of the stopper 104 to the other end. When a rear end collision occurs in the state shown in FIG. 5A, the link plate 103 starts to pivot in the direction in which the left side frame 3b descends, as described above. Concurrently, the stopper 104 rises. However, since the space of S is narrow, the tip end of the stopper 104 hits the lower end of the left side frame 3b. If the stopper 104 hits the lower end of the left side frame 3b before the stopper 104 completely rises to stand straight, generally the stopper 104 cannot rise any more and bounces back to pivot about the pivotal shaft 141 in the direction to fall down (anti-clockwise in the drawing).

However, at the lower end of the left side frame 3b which the tip end of the stopper 104 hits in a state of the FIG. 5A, a lock plate 122 is installed. Accordingly, as indicated by dotted line in FIG. 5A, when the tip end of the stopper 104 hits the lower end of the left side frame 3b, the notch 142 engages with the teeth of the lock plate 122. Thereby, the stopper 104 is supported in an inclined state between the left side frame 3b and the lower plate 101 to prevent the left side frame 3b from descending.

FIG. 5B shows a state that the S is longer than the length from the through-hole 141a of the stopper 104 to the other end thereof and the stopper has not risen completely. When a rear end collision occurs in the state shown in FIG. 5B, the link plate 103 starts to pivot in the direction where the left side frame 3b descends, too. Concurrently, the stopper 104 rises. Since the space S is wide, the stopper 104 completely rises, as shown by dotted line in FIG. 5B. That is, the longitudinal direction of the stopper 104 becomes substantially parallel to the descending direction of the left side frame 3b and the top surface of the stopper 104 receives the descending left side frame 3b. That is, the stopper 104 pivotably supported by the lower plate 101 supports the left side frame 3b in the longitudinal direction of the stopper 104. If force is applied to the top surface of the stopper 104 in the substantially vertical direction, pivot force about the pivotal shaft 141 occurring to the stopper 104 equals to none so that the stopper 104 can stop the descending of the left side frame 3b without pivoting.

FIG. 5C shows a state that the S is longer than the length from the through-hole 141a of the stopper 104 to the other end and the stopper 104 has been risen up completely. When a rear end collision occurs in the state shown in FIG. 5C, the link plate 103 starts to pivot in the direction where the left side frame 3b descends, as well as the foregoing. Pivot force about the pivotal shaft 141 occurs to the stopper 104 as well as the foregoing, but the bottom surface of the stopper 104 at the side where the pivotal shaft 141 penetrates is in touch with the horizontal plate 101a and the pivot force works to pivot toward the corner opposite to the side where the curved surface 145 formed. Therefore, the horizontal plate 101a blocks the pivot of the stopper 104. Consequently, the stopper 104 is supported by the horizontal plate 101a in a state that the longitudinal direction of the stopper 104 is substantially vertical to the horizontal plate 101a, and stops the descending of the left side frame 3b with its top surface.

Thus, the free link 100 according to the present embodiment comprises the stopper 104, which prevents the seat cushion frame from descending suddenly, to improve the safety of an occupant who sits on the seat cushion. In the foregoing explanation, as shown in FIGS. 5A through 5C, the difference between the space S in the uppermost state of the free link 100 and the longitudinal length of the stopper 104 is more than 8 mm. That is, when a rear end collision arises in the uppermost state of the free link 100 as shown in FIG. 5C, the seat cushion frame descends until the space S becomes the longitudinal length of the stopper 104. This is the case to be considered that the level of the seat cushion frame, i.e., the level of the seat cushion shown in FIG. 5B is the most frequently used state.

In other words, it is the case that the longitudinal length of the stopper 104 is decided according to the space S in the seat cushion level of the seat which is considered to be most frequently used. Accordingly, in the seat cushion level of the seat which is considered to be most frequently used, the seat frame can be supported in a state that the stopper 104 has risen instead of a state that the notch 142 engages with the lock plate 122, which improves safety more. Not being limited by this, the longitudinal length of the stopper 104 can be decided according to the space S in the uppermost state of the free link 100 shown in FIG. 5C, and if the space S is smaller than the longitudinal length of the stopper 104, the descending seat frame is supported by the engagement of the notch 142 with the lock plate 122. In this case, the difference between the space S and the longitudinal length of the stopper 104 will not be as large as in FIG. 5C.

In the above description, an example that the stopper 104 is provided only in the free link 100 which is not linked to the power is described. However, it can be also provided in the front lifter and the rear light lifter. This will improve safety much more. In the above description, the free link 100 is provided at the rear end of the left side frame 3b, but may be at any other places, such as the front lifter or the rear right lifter. The link mechanism is not necessarily to be constituted by four links but may be, for example, by six links in total, i.e., three each on the right and left, or more.

In the above description, the stopper pusher 130 is provided on the link plate 103 and the free link 100 is configured so that the stopper 104 pivots in response to pivot of the link plate 103, but the above object can be accomplished without the stopper pusher 130. That is, it can be configured so that the stopper 104 rises as shown in FIG. 5C by only inertia force at the time of the rear end collision. In this case, the stopper is required to be set with inclination so that pivot force occurs in the direction where the stopper 104 rises due to the rear end collision. Instead of pushing and moving by the stopper pusher 130, linking the link plate 103 and stopper 104 via a gear or the like can make the stopper 104 pivot in response to pivot of the link plate 103.

In the above description, the lock plate 122 is formed at the lower end of the left side frame 3b and the notch 142 is formed at the end of the stopper 104, but these members are not necessarily required. For example, adjusting the angle and the friction coefficient of the surface facing the horizontal plate 101a at the bottom end of the left side frame 3b and the angle and the friction coefficient of the tip end at the side which becomes the supporter for the stopper 104 may enable the stopper 104 to support the left side frame 3b even if the stopper 104 has not completely risen.

In the above description, the lower plate 101 and the upper plate 102 are linked via the link plate 103 and the upper plate 102 and the left side frame 3b are linked. However, the link plate 103 and the left side frame 3b may be directly linked, omitting the upper plate 102, or the left side frame 3b may be configured to include the upper plate 102. Also, an example that the lock plate 122 is formed on the left side frame 3b has been described but the lock plate 122 may be formed on the upper plate 102 if the upper plate 102 is facing the horizontal plate 101a. Similarly, the link plate 103 and the base plate 2 may be directly linked, omitting the lower plate 101, or the base plate 2 may be configured to include the lower plate 101.

In the above description, the seat cushion frame is lifted up from the base frame 2 by the power of the motor 4, but the power is not necessarily the one by the motor 4 but may be the one in manual operation. In this case, the same effect as the foregoing can be obtained by the configuration that only the free link 100 is placed between the base frame 2 and the seat cushion frame and is not linked to the power.

In the above description, the link plate 103 is substantially L-shaped and is formed integrally with the stopper pusher 130, but it is not necessarily to be formed integrally with the stopper pusher 130 if the member penetrated by the pivotal shafts 111 and 121 pivots integrally with the stopper pusher 130.

In the above description, an example that the stopper 104 rises by pivot is described as a preferred embodiment of the present invention. Other than this, the same effects as the above example can be achieved by means of various mechanisms, for example, a mechanism for converting horizontal force to vertical force using a slope, a helical mechanism to obtain vertical force by turning a cylindrical member by horizontal force, a mechanism for obtaining vertical force by means of oil pressure, air pressure, water pressure, or the like, a mechanism by an actuator utilizing explosive power of explosive powder or the like. In any case that any mechanism is used for the stopper 104, it is sufficient that the stopper 104 moves on with the seat cushion frame with changes in the space between the seat cushion frame and the base frame 2 so that the stopper 104 moves close to the seat cushion frame by the inertia force of the collision or sensing of the collision.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

This application claims priority from Japanese Patent Application 2006-262551, filed Sep. 27, 2006, which is incorporated herein by reference in its entirety.

What is claimed is:

1. An automotive seat having a level adjusting mechanism for adjusting a seat cushion level, comprising:
   a base frame;
   a seat cushion frame on which a seat cushion is formed, wherein the seat cushion frame is configured to adjust a space between the seat cushion frame and the base frame; and
   a stopper configured to support the seat cushion frame when the seat cushion frame sinks during a rear end collision of an automobile;
   wherein the stopper is configured to move to narrow a space between the stopper and the seat cushion frame to support the seat cushion frame;
   wherein the stopper is pivotably linked to the base frame at a longitudinal end of the stopper and the stopper is configured to support the seat cushion frame with another end of the stopper;
   wherein the automotive seat further comprises:
      a link plate which is pivotably linked to the base frame at a longitudinal end of the link plate, pivotably linked to the seat cushion frame at another end of the link plate, and pivots with changes in the space between the seat cushion frame and the base frame; and
      a stopper pusher configured to pivot integrally with the link plate and to push and move the stopper as the space between the seat cushion frame and the base frame becomes larger such that the stopper pivots toward the seat cushion frame.

2. The automotive seat according to claim 1, wherein the stopper is configured to move when the space between the seat cushion frame and the base frame changes.

3. The automotive seat according to claim 1, wherein:
   the stopper pusher comprises a slider configured to slide on a sliding surface of the stopper and to push and move the stopper; and
   the sliding surface has an inclined surface configured to adjust the pivot of the stopper in association with the pivot of the stopper pusher.

4. The automotive seat according to claim 1, wherein the stopper is configured to move so as to narrow the space between the stopper and the seat cushion frame during the rear end collision of the automobile and is configured to support the seat cushion frame.

5. The automotive seat according to claim 1, wherein the stopper is separated from the seat cushion frame in a normal state and is configured to support the seat cushion frame when the seat cushion frame sinks during the rear end collision of the automobile.

6. The automotive seat according to claim 1, wherein:
   the seat cushion frame comprises a lock having a plurality of teeth; and
   the stopper is linked to the base frame via a pivotal shaft at a longitudinal end thereof, wherein the stopper is configured to pivot about the pivotal shaft and to engage with at least one of the teeth of the lock at another longitudinal end to support the sinking seat cushion frame.

7. The automotive seat according to claim 6, wherein:
   the stopper is configured to pivot with changes in the space between the seat cushion frame and the base frame;
   the stopper is configured to engage with at least one of the teeth of the lock to support the sinking seat cushion frame if a space between the pivotal shaft and the seat cushion frame is smaller than a space between the pivotal shaft and an end of the stopper opposite to the pivotal shaft; and
   the stopper is configured to support the sinking seat cushion frame with the end of the stopper opposite to the pivotal shaft in a state that the stopper stands straight if the space between the pivotal shaft and the seat cushion frame is larger than the space between the pivotal shaft and the end of the stopper opposite to the pivotal shaft.

* * * * *